United States Patent [19]
Majid et al.

[11] Patent Number: 6,087,782
[45] Date of Patent: Jul. 11, 2000

[54] RESONANT MODE POWER SUPPLY HAVING OVER-POWER AND OVER-CURRENT PROTECTION

[75] Inventors: Naveed Majid, Mohegan Lake, N.Y.; Fernand Raphael Cornelis Antheunes; Jerzy Janczak, both of Eindhoven, Netherlands

[73] Assignee: Philips Electronics North America Corporation, New York, N.Y.

[21] Appl. No.: 09/362,466

[22] Filed: Jul. 28, 1999

[51] Int. Cl.[7] .................................................. H05B 37/02
[52] U.S. Cl. ........................ 315/224; 315/307; 315/276; 363/16
[58] Field of Search .................................... 315/119, 307, 315/225, 224, 276, 129; 361/18, 91.2, 93.5, 115, 38; 363/50, 55, 56, 16, 17, 21

[56] References Cited

U.S. PATENT DOCUMENTS

| | | | |
|---|---|---|---|
| 2,928,994 | 3/1960 | Widakowich | 315/205 |
| 4,220,896 | 9/1980 | Paice | 315/205 |
| 4,585,974 | 4/1986 | Stupp et al. | 315/307 |
| 4,692,851 | 9/1987 | Attwood | 363/16 |
| 4,910,440 | 3/1990 | McMullin | 315/307 |
| 5,155,674 | 10/1992 | Tanoue et al. | 363/58 |
| 5,227,964 | 7/1993 | Furuhata | 363/56 |
| 5,450,305 | 9/1995 | Boys et al. | 363/24 |
| 5,703,764 | 12/1997 | Hermann et al. | 363/21 |
| 6,018,467 | 1/2000 | Majid et al. | 363/16 |

FOREIGN PATENT DOCUMENTS

0173345A2  3/1986  European Pat. Off. .

*Primary Examiner*—Don Wong
*Assistant Examiner*—Trinh Vo Dinh
*Attorney, Agent, or Firm*—Edward W. Goodman; Steven R. Biren

[57] ABSTRACT

A resonant mode power supply includes a d.c. voltage source and switching elements for alternatively connecting an oscillating circuit, including the primary winding of a transformer, to the d.c. voltage source and to ground. In order to detect faults in the load on a secondary side of the transformer which would cause the resonant mode power supply to attempt to supply and inordinate amount of power, the power on the primary side is detected and if this primary power exceeds a predetermined threshold value, the frequency of oscillation is increased to reduce the power. If the fault condition persists, the switching of the switching elements is discontinued.

5 Claims, 5 Drawing Sheets

RESONANT MODE POWER SUPPLY HAVING OVER-POWER AND OVER-CURRENT PROTECTION

BACKGROUND OF THE INVENTION

1. Field of The Invention

The subject invention relates to resonant mode power supplies, e.g., for television receivers.

2. Description of The Related Art

Television receivers include power supplies for suppling power to the various circuit components. Generally, these power supplies are in the form of switched-mode power supplies in which a dc voltage is applied to one end of the primary winding of a flyback transformer. The other end of the primary winding is connected to ground through a switching element which is controlled to switch on and off at a determined frequency. The switched power to the transformer is then transferred to the secondary winding for providing the output power.

It has been found that resonant mode power supplies have higher efficiencies and are especially suited for power levels higher than 150W and for power supplies that need to be miniaturized, e.g., power supplies for battery charging. In a resonant mode power supply, an oscillating circuit, which is typically a series oscillating circuit, is supplied through a first switching element with a direct voltage by which the oscillating circuit is excited. After one-half of an oscillating period, the first switching element is opened, and the oscillating circuit is connected to ground through a second switching element, and as a result, the capacitor of the oscillating circuit discharges again, and the oscillation is thus continued. An oscillation can accordingly be excited by alternating opening and closing of the two switching elements.

SUMMARY OF THE INVENTION

It is an object of the present invention to protect the power supply from damaging itself due to a failure in the load causing the power supply to supply too much power to the load.

It is a further object of the present invention to protect the power supply from further damage in the event of a short circuit in the secondary.

These objects are achieved in a resonant mode power supply comprising means for generating a d.c. supply voltage having a first terminal and a second terminal; a first switching element having a first terminal coupled to said first terminal of said generating means, and a second terminal connected to a supply node; a second switching element having a first terminal coupled to said supply node and a second terminal coupled to said second terminal of said generating means; a transformer comprising a primary winding having a first end, and a second end connected to the second terminal of said second switching element, and a secondary winding having a first end, a second end and a central tap connected to ground; a capacitor for coupling the first end of the primary winding to the supply node; a sensing resistor for connecting the second end of the primary winding to said second terminal of said generating means; a first diode for connecting the first end of said secondary winding to an output node; a second diode for connecting the second end of said secondary winding to said output node; and a controller connected to control inputs of said first and second switching elements for alternatively turning on and off said first and second switching elements for inducing an oscillation in an oscillating circuit including at least said capacitor and said primary winding of said transformer, wherein a frequency of said oscillation is inversely proportional to an amount of power being delivered by said resonant mode power supply, characterized in that said resonant power supply further comprises an over-power protection circuit for protecting the resonant power supply against a fault in a load that draws a power larger than normal operating limits, wherein said over-power protection circuit performs a true measurement of real primary power, said over-power protection circuit comprising means for determining an amount of real power being delivered to said resonant mode power supply; means for comparing said real power with a predetermined threshold value; and means for generating a control signal for said controller when said real power exceeds said threshold value, whereby said controller initially increases said frequency of oscillation to reduce the power being delivered, and then stops the switching of the switching elements if the over-power condition persists.

Applicants have recognized that over-power protection is needed to protect the power supply against a fault in a load on the power supply which draws a significantly larger amount of power than that which the power supply would normally allow. The over-power protection circuit of the subject invention measures the real power in the primary which is representative of the output power due to the efficiency of the resonant mode power supply. When this measured real power exceeds a predetermined threshold value, the over-power protection circuit sends a signal to the controller to which, in turn, attempts to reduce the power by increasing the frequency of oscillation in steps up to the maximum frequency. If this does not remedy the fault condition, the controller then shuts down the switching of the switching elements thereby effectively turning off the power supply.

In addition to detecting faults in the load, Applicants recognize the need to determine, for example, short circuits in the secondary of the power supply. To that end, the resonant mode power supply as described above is characterized in that said resonant mode power supply further comprises an over-current protection circuit comprising means for determining a value of a current flowing in said second switching element; means for comparing said current value with a further threshold value; and means for generating a control signal for said controller when said current exceeds said further threshold value, whereby said controller immediately stops the switching of said first and second switching elements.

Applicants also recognize that the over-power protection circuit will not protect the power supply when there is a short circuit in the secondary. With a short circuit at the output, the voltage on the output will drop to zero and the real power transfer will also drop significantly. By sensing the current through the switching elements, and, more particularly through the second switching element, a fault condition can be detected by comparing this current to a further threshold value. If this value is exceeded, the over-current protection circuit then signals the controller to shut down the power supply.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
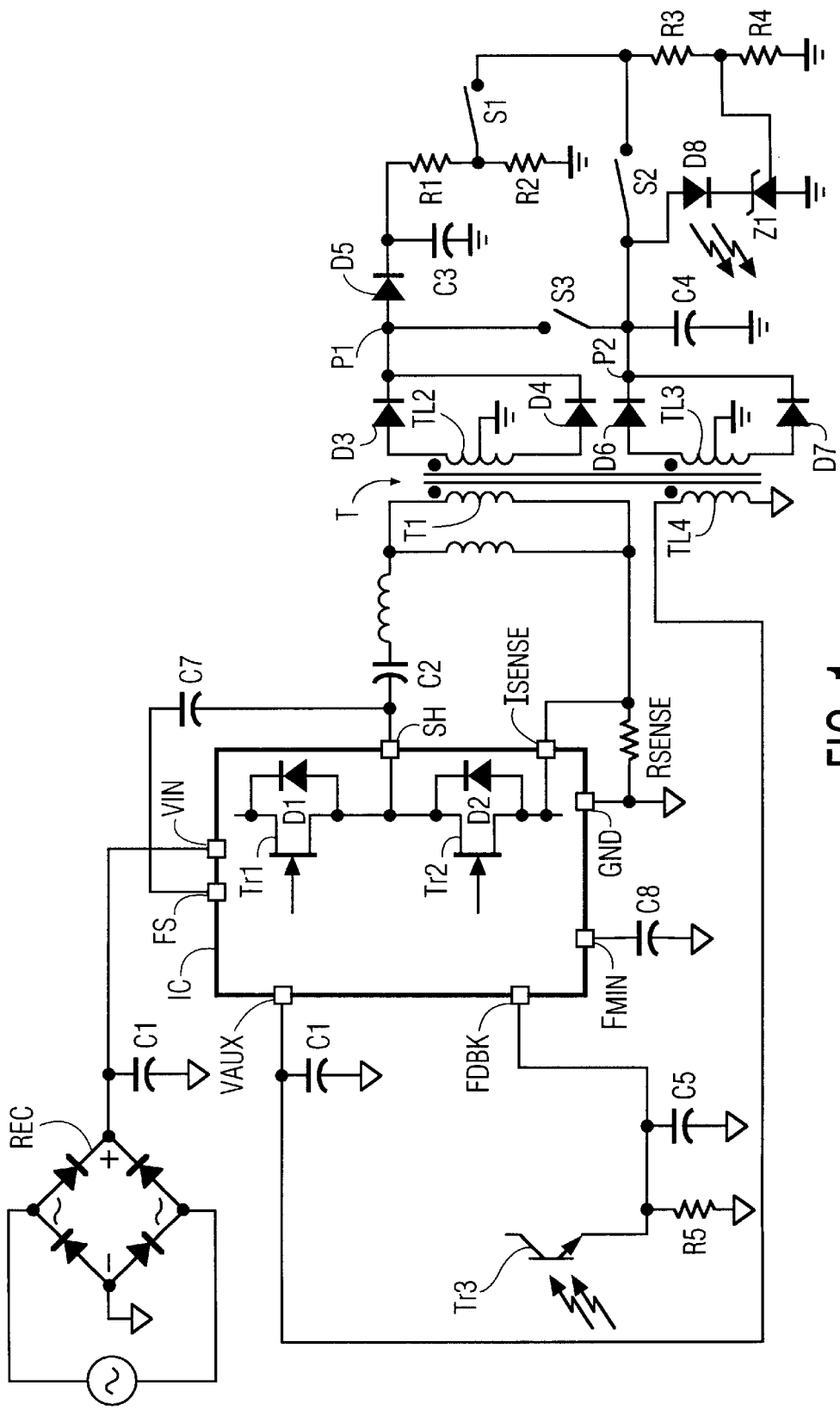
FIG. 1 shows a block schematic diagram of a resonant mode power supply.

FIG. 1 shows a block schematic diagram of a resonant mode power supply. Line voltage is applied to a diode rectifier bridge REC forming a d.c. voltage supply. This d.c. voltage is connected to ground via a capacitor C1 and is also connected to ground via a series arrangement of two switching devices Tr1 and Tr2 shunted by diodes D1 and D2, respectively, through a $V_{IN}$ input and ground GND terminal of a controller IC. The junction between the two switching devices Tr1 and Tr2 is connected to a SH output of the controller IC which is connected to ground via a series arrangement of a capacitor C2, a first inductor L1, a second inductor L2 and a resistor $R_{SENSE}$. A primary winding TL1 of a transformer T is connected across the second inductor L2. A first secondary winding TL2 of the transformer T has a center tap connected to ground, and a first and second diode D3 and D4 having their anodes connected to the ends of the first secondary winding TL2 and their cathodes interconnected at a junction point P1. An output diode D5 has its anode connected to the junction point P1 and its cathode connected to ground via an output capacitor C3 and via a series arrangement of two resistors R1 and R2. The output voltage of the resonant mode power supply is taken across the output capacitor C3.

For controlling the power supply, the transformer T has a second secondary winding TL3 of the transformer T which has a center tap connected to ground, and a third and a fourth diode D6 and D7 having their anodes connected to the ends of the second secondary winding TL3 and their cathodes interconnected at a junction point P2. A first switch S1 connects the junction between the resistors R1 and R2 to ground via a series arrangement of two resistors R3 and R4. A second switch S2 connects the resistors R3 and R4 to the junction point P2. A third switch S3 connects the junction point P1 to the junction point P2, which is connected to ground via a capacitor C4. In addition, the junction point P2 is connected to ground via a series arrangement of a light emitter D6 of an opto-coupler and a zener diode Z1 having a control line connected to the junction point between the resistors R3 and R4.

The opto-coupler is used for controlling the regulation voltage of the power supply and further includes a sensor Tr3 for sensing the light output from the light emitter D8. An output from the sensor Tr3 is connected to a feedback (FDBK) input of the controller IC, which is also connected to ground via a resistor R5 and a capacitor C5.

The transformer T further includes an auxiliary winding TL4 for supplying an auxiliary voltage to the controller IC $V_{AUX}$ input via a diode D9. The $V_{AUX}$ input is also connected to ground by a capacitor C6. A capacitor C7 further connects the SH output to a floating source (FS) input of the controller IC. Finally, a capacitor C8 couples a $F_{MIN}$ input of the controller IC to ground.

Figure 2:
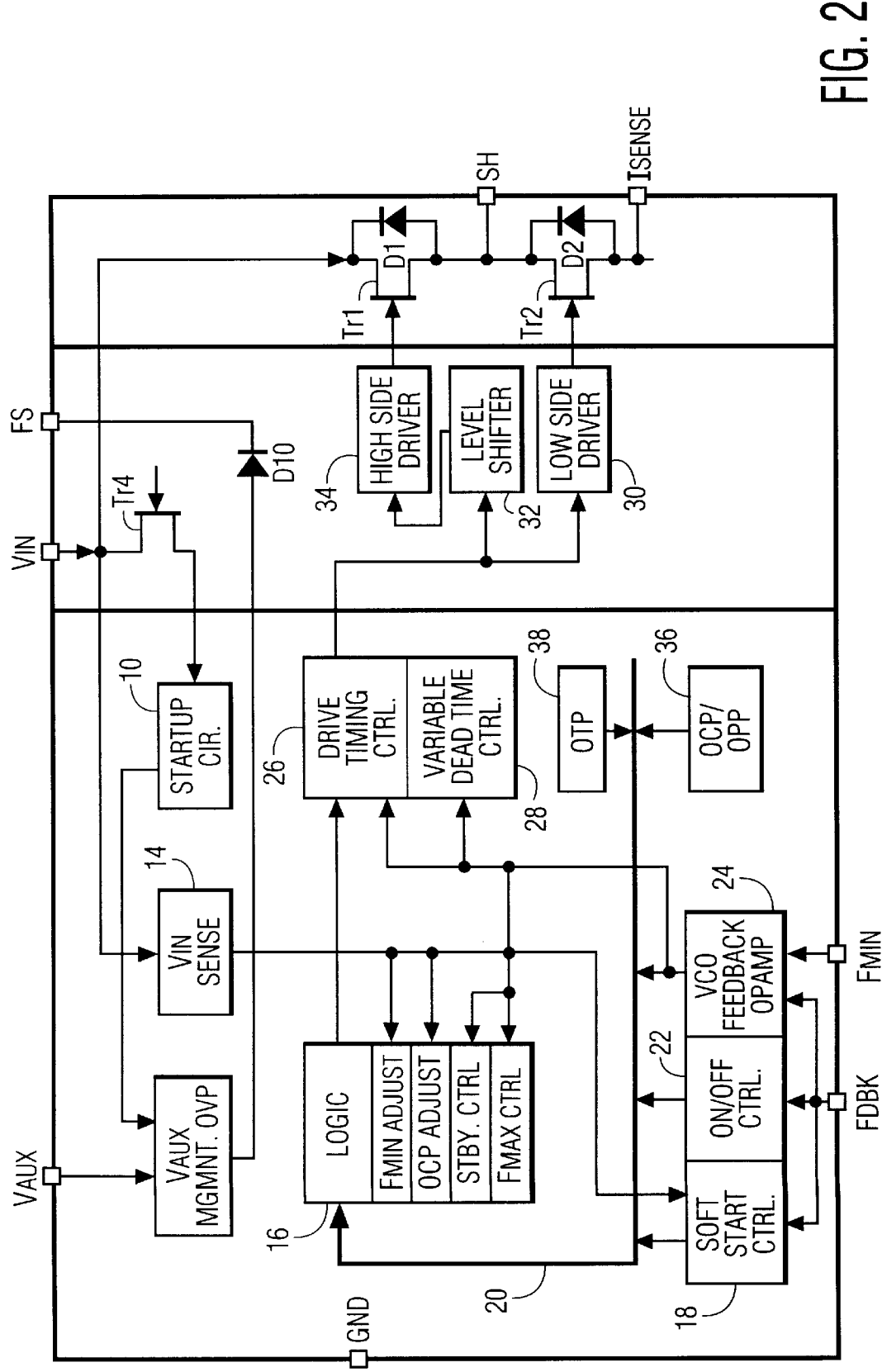
FIG. 2 shows a block diagram of the controller IC.

FIG. 2 shows a block diagram of the controller IC. The $V_{IN}$ input, in addition to being connected to the switching device Tr1, is connected, through a switching transistor Tr4, to a startup circuit 10 which applies a control signal to a $V_{AUX}$ management circuit 12 which is connected to the $V_{AUX}$ input of the controller IC. An over-voltage protection input of the $V_{AUX}$ management circuit 12 is connected to the FS input via a diode D10. A $V_{IN}$ sensing circuit 14 is also connected to the $V_{IN}$ input and applies a control signal to a FMIN adjust input and an OCP input of a logic circuit 16 and also to a control input of a soft-start controller 18. The soft-start controller 18 is connected to the FDBK input and applies a control signal to the logic circuit 16 via input bus 20. An ON/OFF controller 22 is also connected to the FDBK input and applies a control signal to the logic circuit 16 via the input bus 20. In addition, a VCO feedback op-amp 24 is connected to the FDBK input and to the $F_{MIN}$ input and applies another control signal to the logic circuit 16 via the input bus 20, as well as to a stand-by control input and a $F_{MAX}$ input of the logic circuit 16. An output from the logic circuit 16 is connected to a drive timing controller 26 which also receives the output from the VCO feedback op-amp 24. The drive timing controller 26 has a variable dead-time controller 28 connected to it which also receives the output from the VCO feedback op-amp 24. An output from the drive timing controller 26 is connected to a low side driver 30 which controls the switching device Tr2. The output from the drive timing controller 26 is further applied to a level shifter 32 which applies its output signal to a high side driver 34 for controlling the switching device Tr1. An over-current/over-power protection circuit 36 is connected to the low side of the switching device Tr2 which is also connected to the $I_{SENSE}$ input of the controller IC. The over-current/over-power protection circuit 36 applies control signals to the logic circuit 16 via the input bus 20. In addition, an over-temperature protection circuit 38 is included and applies a control signal to the logic circuit via the input bus 20.

In operation, under control of the logic circuit 16, the drive timing controller 26 applies signals to the low-side driver 30 for driving the switching element Tr2, and to the high-side driver 34 through the level shifter 32 for driving the switching element Tr1. The switching elements Tr1 and Tr2 are alternately closed and opened every half oscillation period of the oscillating circuit formed by the capacitor C2, the inductors L1 and L2, and the primary winding TL1, thereby inducing a voltage in the secondary windings TL2 and TL3. The voltage across the primary winding TL1 appears in the auxiliary winding TL4 for controlling the power supply. An object of the over-current/over-power protection circuit 36 is:

(a) to protect the output (secondary side) against too large transfer of power. Such a situation can arise due to malfunction of circuit components that form part of the load, leading to a large increase in demand for power. The controller IC in such a case will attempt to provide more and more power to the output. Such a situation can lead to failure of components on the secondary. The over-power protection portion of this circuit protects against such a situation;

(b) to protect components on the primary side from failure due to a large increase in current caused by a short circuit on the secondary. Such an increase in current can lead to increased dissipation in components, such as power devices, which can then cause failure. The over-current protection portion of this circuit protects against such a situation.

Figure 3:
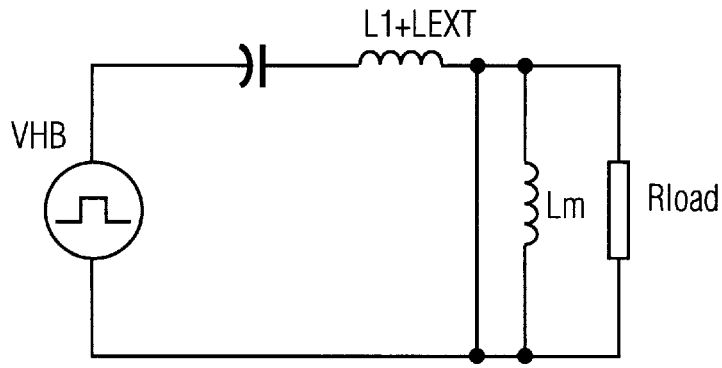
FIG. 3 shows a schematic diagram of a simplified resonant circuit.

A secondary short circuit will short the magnetizing inductance and only the leakage inductance plus an external inductance, if present, is left in the main power conversion path. FIG. 3 shows a simplified resonant circuit to illustrate this situation. Two things will happen as a result of this change, i.e., the resonant primary current will increase, and the circuit will be forced into a capacitive mode of operation.

The impedance in the circuit is given by:

$$X = jw(Ll + Lext) + \frac{jwLmRload}{R + jwLm} - \frac{j}{wC} \qquad 1$$

With Lm and Rload (reflected to the primary) shorted, in general, the total impedance in the primary power path will become smaller. This will lead to an increase in resonant primary current. This current will be mostly reactive in nature because, due to the short circuit on the secondary, no power is being delivered to the output. Pout in the Equation 2 will reduce to zero with the output short circuited.

$$\text{Pinput=Pout+RonI}^2\text{rms+Plosses} \qquad 2$$

Figure 4:
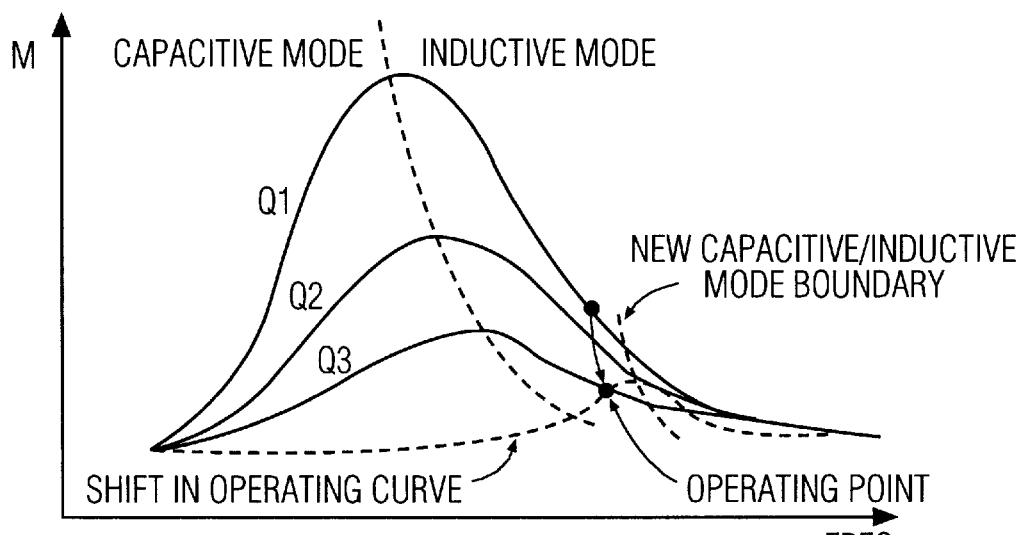
FIG. 4 is a graph showing the change in operation of the resonant mode power supply from inductive mode to capacitive mode.

With TL1 shorted, the impedance X becomes capacitive in nature. FIG. 4 shows the change in operation from Inductive to Capacitive mode. FIG. 4 also shows the path that will be taken as the old operating point moves to the new operating points. As soon as the short is applied, the voltage at the output to the LC tank, made up of L1+Lext and C in FIG. 3, will change from Vout to ground. With such a step change, the circuit will oscillate before settling at its new operating point in capacitive mode. The duration of oscillation will depend upon the damping present in the circuit.

Figure 5:
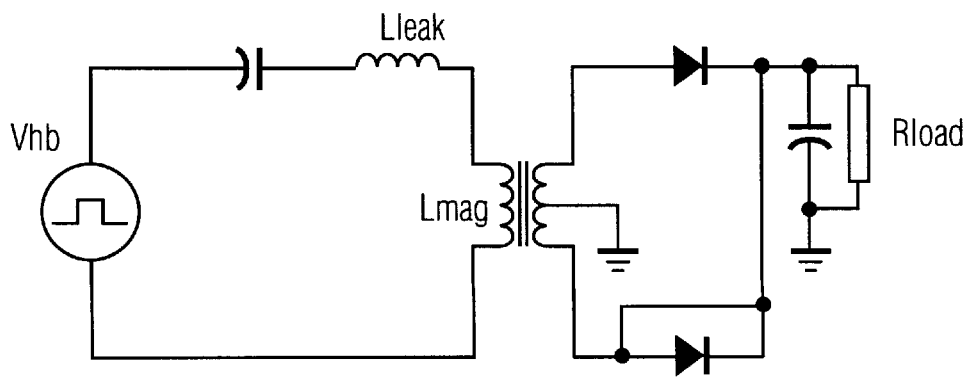
FIG. 5 shows a schematic diagram of a simplified resonant circuit in the capacitive mode.

Over-current protection can also arise if one of the diodes on the secondary is short circuited. FIG. 5 shows the resonant circuit in such a situation. Such a situation will be equivalent to the one described above after a few cycles because the transformer will saturate and essentially act as a short circuit. The transformer will saturate because with one of the diodes shorted, there will be a DC voltage across the transformer for half the switching cycle. The resonant circuit will see the Lmag in part of the switching cycle (depending upon whether the current is flowing in the short or in the good diode on the secondary side) and will not see it in the other part.

It is possible that due to a fault in the load connected to the secondary output, a large current will be drawn by the load. The power supply will be required to provide a large amount of power, beyond its nominal ratings, to the output. If such a situation persists, it can lead to failure of components that form the load or the components that make up the power supply.

Figure 6A:
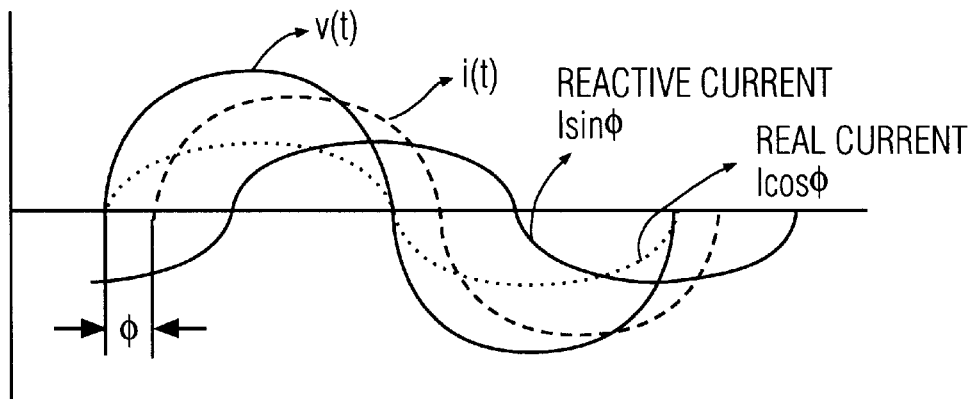
FIG. 6A is a graph showing the real and imaginary components of the resonant current.
Figure 6B:
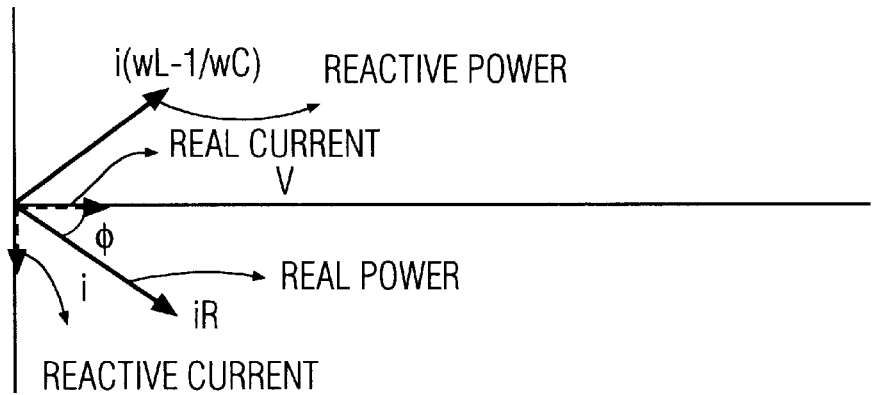
FIG. 6B is a graph showing the real and imaginary components in terms of phasors.

Because of the resonant nature of the current, it is composed of two components, imaginary (or reactive) and real (or active). Using the fundamental harmonic approach, FIG. 6A shows the real and imaginary components of the current. FIG. 6B shows the real and imaginary currents and the real and imaginary powers in terms of phasors. All real energy transfer is done by the real component of the current, which also includes energy transferred to the output (Pout) as well as energy dissipated in the circuit parasites (Plosses) and $RonI^2 rms$.

Traditional ways of current measurement, where the peak current is sensed using a current sense resistor and then compared to fixed threshold internal to the IC, are not sufficient for resonant applications for protection against over power and over current. This is because of the presence of a reactive component besides the real component of current, and because of the effect of input voltage.

If a short circuit occurs on the secondary as indicated above, very little real power will be delivered to the secondary side, and the resonant primary current will increase. This increase will cause an increase in losses in components on the primary side (RMS losses in switches, diodes, etc.) Of the circuit. The real component of the current will be very small compared to the reactive component of the current.

Figure 7:
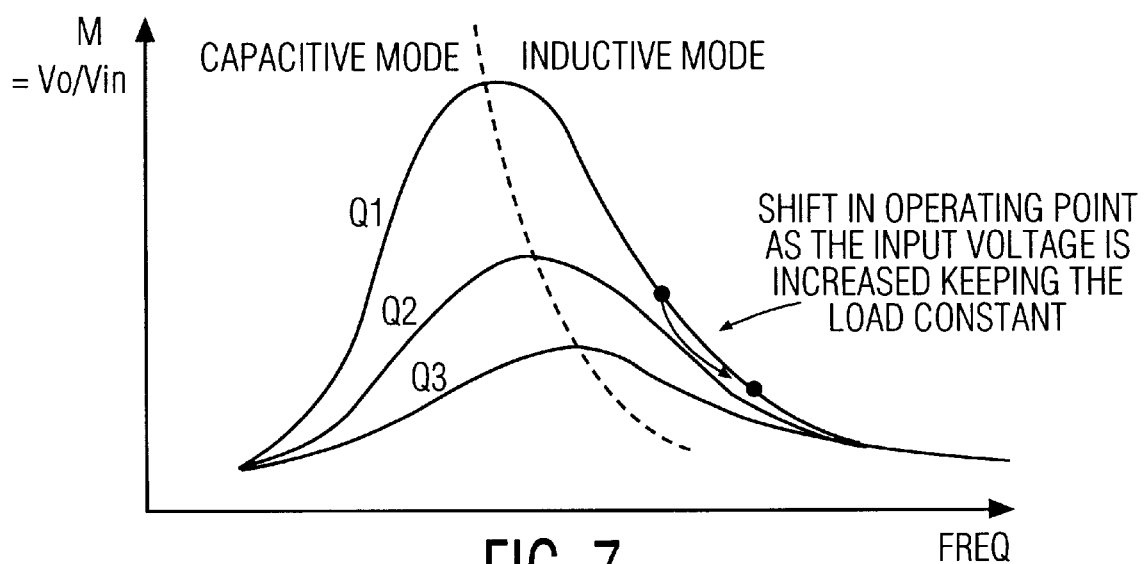
FIG. 7 is a graph showing the effects of the input voltage on the resonant current.

In traditional peak current based over-current protection, the over-current threshold is fixed to a reference voltage internal to the chip. As the input voltage changes, the feedback adjusts the frequency of operation to keep the output voltage level constant. For example, to compensate for an increase in the input voltage, the feedback circuit will cause an increase in frequency of operation (FIG. 7). With increasing frequency, the amplitude of the current will drop and vice versa to keep the power level the same:

$$\text{Pout=Pin}\eta = \int \text{VinIin}dt \qquad 3$$

Depending upon the frequency of operation, therefore, the ΔIp required to reach the over-current level will be different. In other words, the amount of current stress on the circuit components and power delivered will be different for different operating frequencies (which is a result of change in input voltage), before the over-current threshold is reached. Another way of saying the same is that the power is higher at higher input voltages before the over-current threshold is detected. The wider the operating frequency range, the worse this problem becomes.

Over-power protection is needed to protect the system against a fault in the load that draws a power larger than the normal operating limits of the system permit. Over-power protection consists of a true measurement of the real power on the primary. Over-power protection is also required in order to separate the real power, which represents the power delivered to the output, from the reactive power (also called blind or circulating power). Over-power protection will also do away with the effect of input voltage on the resonant primary current. An accurate way of implementing over-power protection is by measuring the real power being delivered to the power supply. The real power is measured on the primary side of the circuit. The primary side real power is a good approximation for the output power as the efficiency of the resonant mode supplies is generally fairly high (e.g., 85% to 95%). The real power being delivered is equal to the average power measured over one cycle:

$$P = S\cos(\phi) = \frac{1}{T}\int_0^T Iin(t)V(t)dt \qquad 4$$

The information about the primary current Iin(t) is available at the $I_{SENSE}$ input while the voltage V(t) is the voltage at the mid-point of the half bridge (SH). By performing an analog multiplication and integrating over a period, the real power on the primary side of the converter can be measured.

Figure 8:
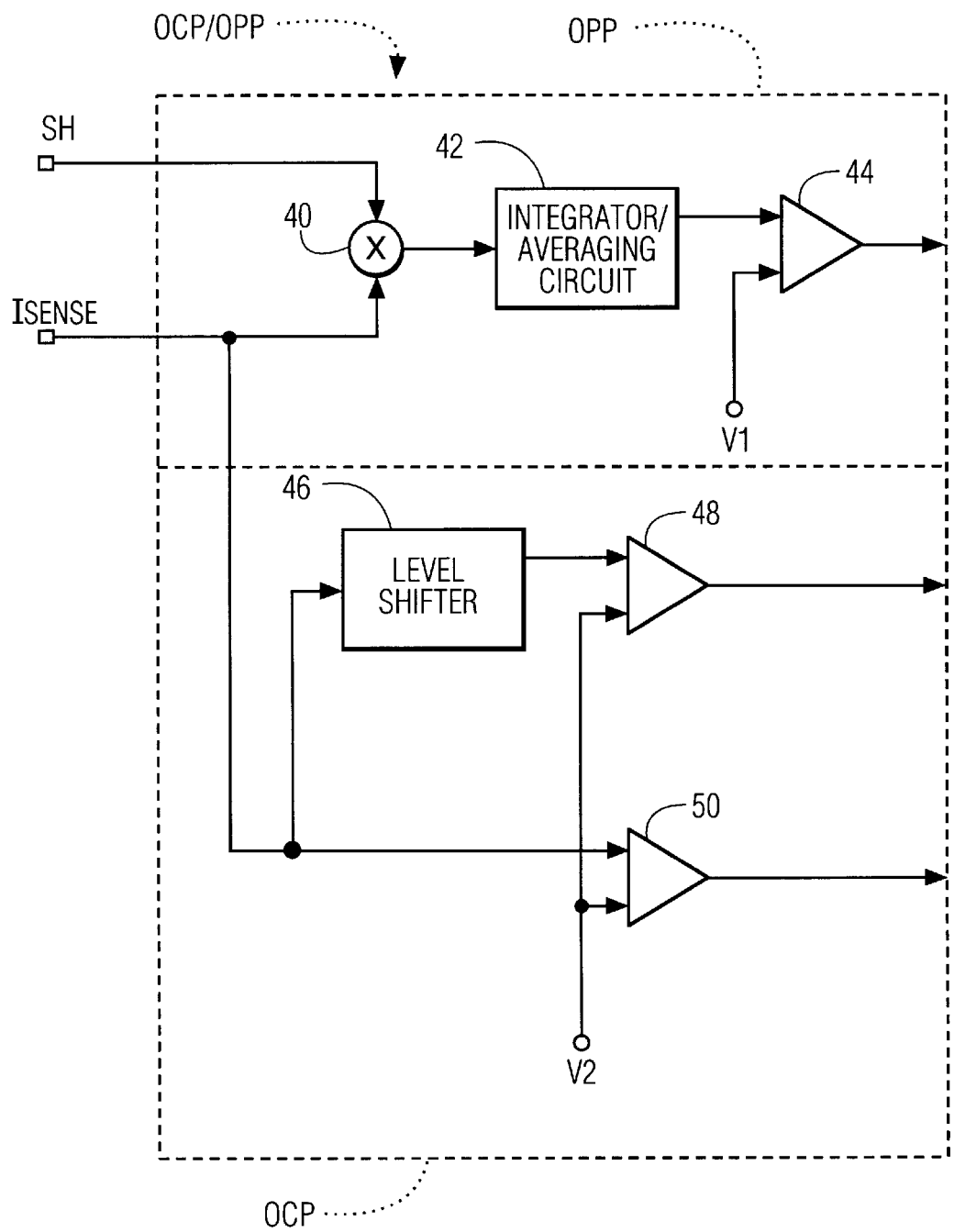
FIG. 8 shows a block diagram of the over-current/over-power protection circuit.

FIG. 8 shows a block diagram of the over-current/over-power protection circuit 36. The OPP portion of the OPP/OCP circuit 36 includes a multiplier 40 for receiving the voltage at the SH output and the current at the $I_{SENSE}$ input. An output of the multiplier 40 is applied to an integrator/averaging circuit 42. The output from the integrator/ averaging circuit 42 is then applied to a comparator 44 and compared with a threshold voltage V1. The output from the comparator 44 is sent to the logic circuit along the input bus 20.

The threshold V1 is implemented in the controller IC for protection against over-power. On detection of an over-power condition that violates V1, the logic circuit 16 reacts by increasing the frequency of operation. The increase in frequency will be done in a fixed number of increments to maximum frequency. By increasing the frequency of operation, the amount of power delivered to the output will be reduced. If the over-power condition persists, then the frequency will be increased a second time. This will continue until maximum frequency is reached. If the over-power condition still persists, the logic circuit 16 detects this and will stop the switching of the switching devices Tr1 and Tr2. The controller IC will then enter safe-restart mode where the $V_{AUX}$ voltage will be allowed to drop to the UVLO level. On reaching UVLO, the start-up circuit 10 will be activated to charge the $V_{AUX}$ capacitor C6 back to its Vstart level and a new switching cycle will be initiated. If the fault condition still persists, the logic circuit 16 will again stop the switching and the controller IC will go through another ▓ hiccup▓. The system will always go through a soft start phase during every safe restart cycle. In case of a fault condition, starting with the highest frequency (minimum peak resonant primary current) gives greater protection against the possibility that the offending fault condition is still persisting.

Over-power protection will not protect the resonant circuit against conditions where a short circuit exists on the secondary. In order to see why that is not so, we have to notice that the power transfer is done only by the real part of the current. With a short circuit at the output, the voltage on the output will drop to zero and the real power transfer will also drop significantly (Pout=0 and real power transfer will only take place to parasitic resistive elements, Plosses and RonI$_2$rms). That will mean that most of the current will now be imaginary and not real. With over-power protection, we are performing a real power measurement. With only a small amount of real power being delivered, the over-power protection will fail to recognize the fault condition. To protect the switching devices, an over-current protection should also be implemented. Over-current protection is similar to tradition peak current measurement over a sense resistor and comparison to a fixed threshold based on a reference voltage.

As shown in FIG. 8, the OCP portion consists of a level shifter 46 connected to the ISENSE input. An output from the level shifter 46 is connected to a first comparator 48. The ISENSE input is also connected directly to a second comparator 50. A threshold voltage V2 is applied to the second inputs of the first and second comparators 48 and 50. The outputs from the comparators are sent to the logic circuit 16 via the input bus 20.

The switching devices Tr1 and Tr2 are chosen based upon the worst condition currents in the circuit. The threshold voltage V2 should be set to this worst case condition and need not be adjusted with the input voltage variation. On detection of an over-current condition, the logic circuit 16 puts the converter directly into safe-restart mode. An over-current condition will occur due to a short on the secondary. Such a fault is generally permanent in nature and will persist even if it is tried to ramp up the frequency of operation.

It should be noted that the current sense resistor $R_{SENSE}$ is connected to sense the resonant primary current in both directions. The level shifter 46 shifts the level of the signal at $I_{SENSE}$ input when the current is flowing so as to create a negate sense voltage at the $I_{SENSE}$ input.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A resonant mode power supply comprising:

means for generating a d.c. supply voltage having a first terminal and a second terminal;

a first switching element having a first terminal coupled to said first terminal of said generating means, and a second terminal connected to a supply node;

a second switching element having a first terminal coupled to said supply node and a second terminal coupled to said second terminal of said generating means;

a transformer comprising a primary winding having a first end, and a second end connected to the second terminal of said second switching element, and a secondary winding having a first end, a second end and a central tap connected to ground;

a capacitor for coupling the first end of the primary winding to the supply node;

a sensing resistor for connecting the second end of the primary winding to said second terminal of said generating means;

a first diode for connecting the first end of said secondary winding to an output node;

a second diode for connecting the second end of said secondary winding to said output node; and a controller connected to control inputs of said first and second switching elements for alternatively turning on and off said first and second switching elements for inducing an oscillation in an oscillating circuit including at least said capacitor and said primary winding of said transformer, wherein a frequency of said oscillation is inversely proportional to an amount of power being delivered by said resonant mode power supply, characterized in that said resonant power supply further comprises an over-power protection circuit for protecting the resonant mode power supply against a fault in a load that draws a power larger than normal operating power limits, wherein said over-power protection circuit performs a true measurement of real primary side power, said over-power protection circuit comprising:

means for determining an amount of said real power being delivered to said resonant mode power supply;

means for comparing said real power with a predetermined threshold value; and means for generating a control signal for said controller when said real power exceeds said threshold value, whereby said controller initially increases said frequency of oscillation to reduce the power being delivered, and then stops the switching of the first and second switching elements if an over-power condition persists.

2. The resonant mode power supply as claimed in claim 1, characterized in that said power determining means comprises:

means for determining a value of a current flowing through said second switching element;

a multiplier for multiplying a voltage at said supply node with said determined current value; and an integrator averager for integrating and averaging an output from said multiplier.

3. The resonant mode power supply as claimed in claim 1, characterized in that said resonant mode power supply further comprises an over-current protection circuit comprising:

means for determining a value of a current flowing in said second switching element;

means for comparing said current value with a further threshold value; and means for generating a control signal for said controller when said current exceeds said further threshold value, whereby said controller immediately stops the switching of said first and second switching elements.

4. The resonant mode power supply as claimed in claim 2, characterized in that said means for determining a value of a current flowing through said second switching element comprises:

means for measuring a voltage across said sensing resistor.

5. The resonant mode power supply as claimed in claim 4, characterized in that said power determining means comprises:

a multiplier for multiplying a voltage at said supply node with said determined current value; and an integrator averager for integrating and averaging an output from said multiplier.

* * * * *